US008441583B2

(12) United States Patent
Lee et al.

(10) Patent No.: US 8,441,583 B2
(45) Date of Patent: May 14, 2013

(54) THIN TOUCH PANEL

(71) Applicant: Buwon Advanced Coating Technology Co., Ltd., Taoyuan County (TW)

(72) Inventors: Sheng-Feng Lee, Taoyuan County (TW); Ching-Hsien Wen, Taoyuan County (TW)

(73) Assignee: Buwon Advanced Technology Co., Ltd., Taoyuan County (TW)

( * ) Notice: Subject to any disclaimer, the term of this patent is extended or adjusted under 35 U.S.C. 154(b) by 0 days.

(21) Appl. No.: 13/679,578

(22) Filed: Nov. 16, 2012

(65) Prior Publication Data
US 2013/0069901 A1    Mar. 21, 2013

Related U.S. Application Data

(63) Continuation of application No. 12/727,055, filed on Mar. 18, 2010, now Pat. No. 8,339,527.

(30) Foreign Application Priority Data

Jul. 10, 2009  (TW) ................................ 98212622 U

(51) Int. Cl.
*G02F 1/1335* (2006.01)

(52) U.S. Cl.
USPC ............................................................ 349/12

(58) Field of Classification Search .................. 349/12; 345/173–175
See application file for complete search history.

(56) References Cited

U.S. PATENT DOCUMENTS
2008/0186288 A1*  8/2008  Chang ........................... 345/174

* cited by examiner

*Primary Examiner* — Phu Vu
(74) *Attorney, Agent, or Firm* — Muncy, Geissler, Olds & Lowe, PLLC

(57) ABSTRACT

A thin touch panel includes a transparent substrate with a black bordering around the inner surface of the transparent substrate. A plurality of metal connecting structures, metal guiding lines, transparent insulating structures and a transparent sensing layer are formed on the inner surface, so that the transparent substrate not only provides a touch surface, but also has the touch sensing ability, to decrease the manufacture material and increase the transmittance of the touch panel. Besides, the manufacture of the thin touch panel may not use any optical adhesive to decrease the manufacture cost and improve the yield. Further, the thin touch panel may satisfy the trend of thin design.

14 Claims, 15 Drawing Sheets

THIN TOUCH PANEL

CROSS-REFERENCE TO RELATED APPLICATION

This application is a continuation of prior application Ser. No. 12/727,055, filed on Mar. 18, 2010. The patent application identified above is incorporated here by reference in its entirety to provide continuity of disclosure.

BACKGROUND OF THE INVENTION

1. Field of the Invention

The present invention generally relates to a capacitive touch panel, and more particularly to a thin touch panel.

2. Description of the Related Art

Most of the existing electronic products such as handheld computer, personal digital assistant (PDA), and information appliance (IA) may be equipped with a touch display screen 10 as illustrated in FIG. 1. The touch display screen 10 mainly comprises a capacitive touch module 12 and a display panel 14. The conventional capacitive touch module 12 comprises a capacitive touch panel 16 and a cover lens 18. A top surface 181 of the cover lens 18 is capable of being a finger touch region. A black pattern 20 is formed on edges of a bottom surface 182 of the cover lens 18, and the black pattern 20 is tightly combined with a glass substrate 161 of the capacitive touch panel 16 by sticking an optical adhesive 22. A sensing circuit layer 162 consisted of a transparent conductive film 163 such as indium tin oxide (ITO), an insulating layer 164 and metal lines 165 is formed on a bottom surface of the glass substrate 161, which may detect capacitance variations and induced currents caused of the sensing circuit layer 162 being touched, so as to further calculate a coordinate of a position being touched. In addition, a transparent over coat 24 is formed under the sensing circuit layer 162 to protect the sensing circuit layer 162 from being scraped.

However, the cover lens 18 and the glass substrate 161 of the capacitive touch panel 16 mentioned above are both made of glass. Thus, more materials may be consumed during manufacturing. In addition, the conventional capacitive touch panel 16 and cover lens 18 are manufactured respectively first and then unitized by stacked up in sequence. However, the assembling process not only more complicated and spends much time, but also increases the total height of the capacitive touch module 12, thus unable to confirm lighter and thinner requirement of the existing electronic products. Furthermore, since the optical adhesive 22 is much expensive and hard to be stuck well, all the optical adhesive 22, the capacitive touch panel 16 and cover lens 18 have to be discarded because of unable to be reworked. Thus, these materials are wasted.

SUMMARY OF THE INVENTION

The present invention is directed to a thin touch panel, wherein a black bordering, a transparent sensing layer, a plurality of metal connecting structures, a plurality of metal guiding lines and a plurality of transparent insulators are formed on an inner surface of a transparent substrate directly. Thus, the transparent substrate may not only be a touch end, but also have a touch control ability of thin touch panel directly. Comparing to the conventional touch panel, the glass substrate of the touch panel disposed between the cover lens and the display panel may be simplified, so as to reduce material consumption and increase a transparency of the touch panel. In addition, the process of sticking the cover lens and the glass substrate by using the optical adhesive may be left out, so as to further reduce the cost of the sticking process and enhance the yield rate. Furthermore, the thickness of the whole structure of the touch panel is reduced, so as to benefit a design tendency of thinning out the product.

According to an embodiment of the present invention, the thin touch panel comprises a transparent substrate having an outer surface (an upper side of the substrate) and an inner surface (a lower side of the substrate) opposite to one another, the outer surface capable of being a touch end; a black bordering formed on edges of the inner surface (lower side of the substrate) to dispose around a sensing region; a plurality of metal connecting structures arranged as an array and formed on the sensing region, and a plurality of metal guiding lines formed on a surface of the black bordering; a plurality of transparent insulators respectively corresponding to each of the metal connecting structures and respectively covering part of the metal connecting structures, and two opposite ends of the metal connecting structures being exposed; a transparent sensing layer comprising a plurality of first sensing pads arranged on the sensing region as an array, a plurality of transparent conductive connecting structures disposed across surfaces of the transparent insulators to electrically connect the first sensing pads and part of the metal guiding lines along a first direction, a plurality of second sensing pads arranged on the sensing region as an array, and the second sensing pads and part of the metal guiding lines being electrically connected along a second direction by the exposed opposite ends of the metal connecting structures (the second direction is different to the first direction); and a transparent over coat covering the transparent sensing layer, the transparent insulators, the metal connecting structures and the metal guiding lines.

According to another embodiment of the present invention, the thin touch panel comprises a transparent substrate having an outer surface (an upper side of the substrate) and an inner surface (a lower side of the substrate) opposite to one another, the outer surface capable of being a touch end; a black bordering formed on edges of the inner surface (lower side of the substrate) to dispose around a sensing region; a transparent sensing layer comprising a plurality of first sensing pads and a plurality of transparent conductive connecting structures formed on the sensing region of the inner surface, and the transparent conductive connecting structures electrically connecting the first sensing pads along a first direction, a plurality of second sensing pads formed on the sensing region adjacent to and isolated from one another and alternately arranged with the first sensing pads, and a plurality of transparent guiding lines formed on a surface of the black bordering, and electrically connected to part of the first sensing pads and part of the second sensing pads; a plurality of transparent insulators respectively covering each corresponding transparent conductive connecting structure, and each transparent insulator crossing on two adjacent ends of two isolated second sensing pads; a plurality of metal connecting structures respectively formed on each transparent insulator, and electrically connecting the second sensing pads along a second direction (the second direction is different to the first direction); a plurality of metal guiding lines formed on the transparent guiding lines; and a transparent over coat covering the transparent sensing layer, the transparent insulators, the metal connecting structures and the metal guiding lines.

DETAILED DESCRIPTION OF THE PREFERRED EMBODIMENTS

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 1:
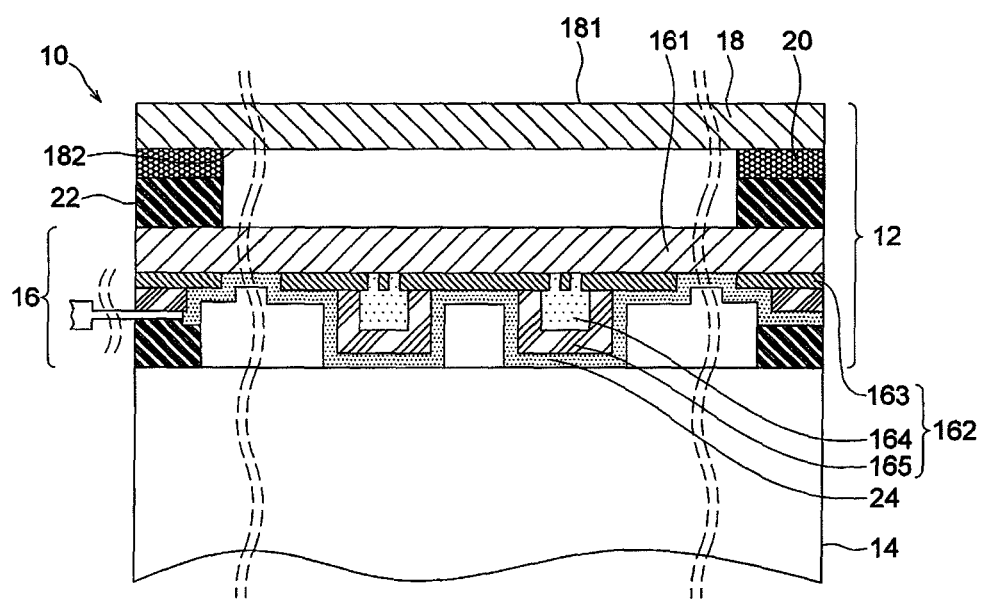
FIG. 1 illustrates a cross-sectional view of a conventional touch panel.
Figure 2A:
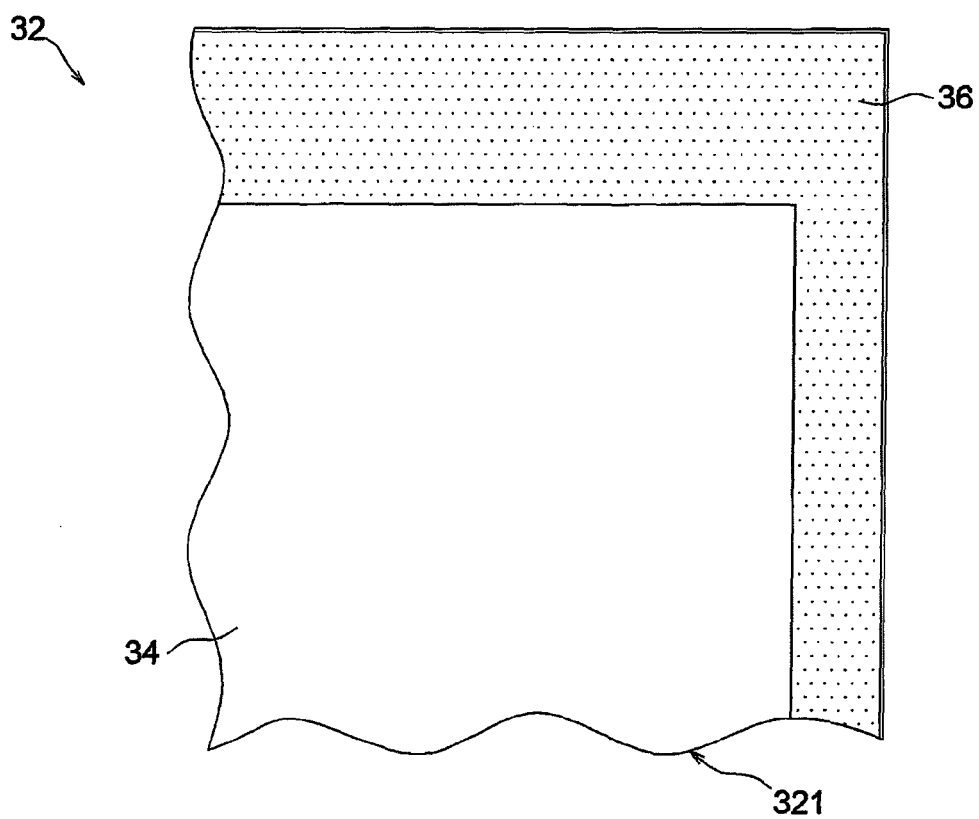
FIG. 2A illustrates a top view of a thin touch panel formed with a black bordering according to an embodiment of the present invention.

Referring to FIG. 2A, a thin touch panel comprises a transparent substrate 32 having an outer surface (not shown) and an inner surface 321 opposite to one another. The outer surface is capable of being a touch end. The inner surface 321 is designed with a sensing region 34, and a black bordering 36 are formed on edges of the inner surface 321 to dispose around the sensing region 34. In an embodiment, the transparent substrate 32 may be a transparent insulating board or a transparent insulating flexible board with a material of glass, polycarbonate (PC), polyethylene terephthalate (PET), polymethylmethacrylate (PMMA), cyclic olefin copolymer (COC) or polyether sulfone (PES). However, the material of the transparent substrate 32 of the present invention is not limited to the previous materials. In addition, the black bordering 36 may be a black array pattern made of chromium (Cr), chromium oxide or resin.

Figure 2B:
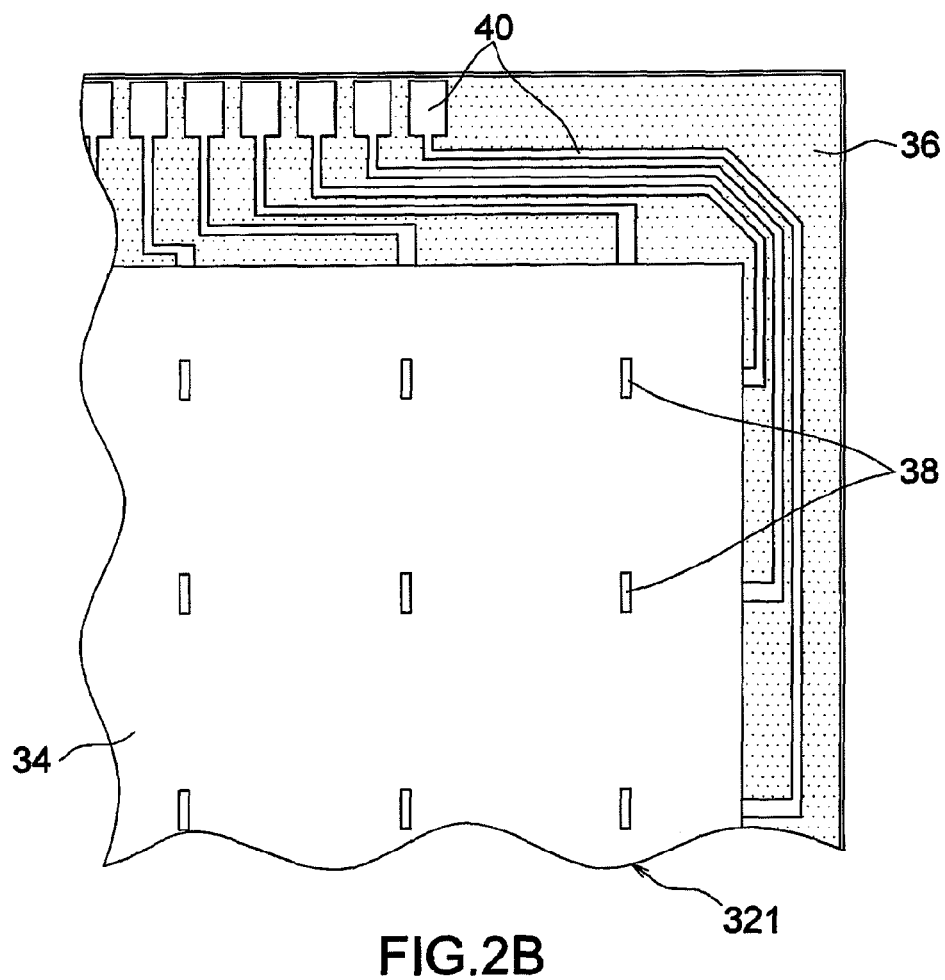
FIG. 2B illustrates a top view of a thin touch panel formed with a black bordering, metal connecting structures and metal guiding lines according to an embodiment of the present invention.

In addition, referring to FIG. 2B, a plurality of metal connecting structures 38 are arranged as an array and formed on the sensing region 34 of the inner surface 321, and a plurality of metal guiding lines 40 are formed on a surface of the black bordering 36. In an embodiment, the metal connecting structures 38 and the metal guiding lines 40 are formed on the sensing region 34 and on the black bordering 36 respectively by forming one or a stack of metal material layer(s) with a conventional method, such as, but not limited to, sputtering deposition method, wherein the metal material comprises at least one of, but not limited to, silver (Ag), chromium (Cr), aluminum (Al) or a molybdenum/aluminum/molybdenum (Mo/Al/Mo) stack layer.

Figure 2C:
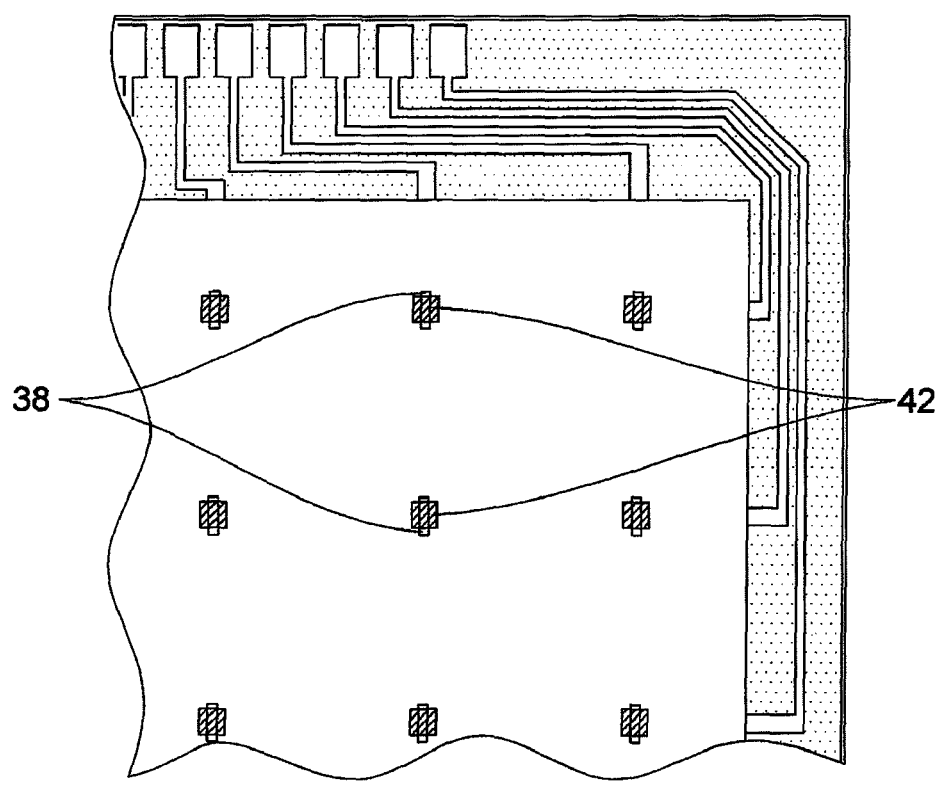
FIG. 2C illustrates a top view of a thin touch panel formed with a black bordering, metal connecting structures, metal guiding lines and transparent insulators according to an embodiment of the present invention.

Then referring to FIG. 2C, a plurality of transparent insulators 42 are respectively corresponding to each metal connecting structures 38, and respectively crosses and covers a center part of each metal connecting structures 38, thus only two opposite ends of each metal connecting structures 38 are exposed. In an embodiment, the transparent insulators 42 are formed from a photosensitive transparent insulating layer made of, such as, but not limited to, ink or PET with high transparency after exposure and development processes.

Figure 2D:
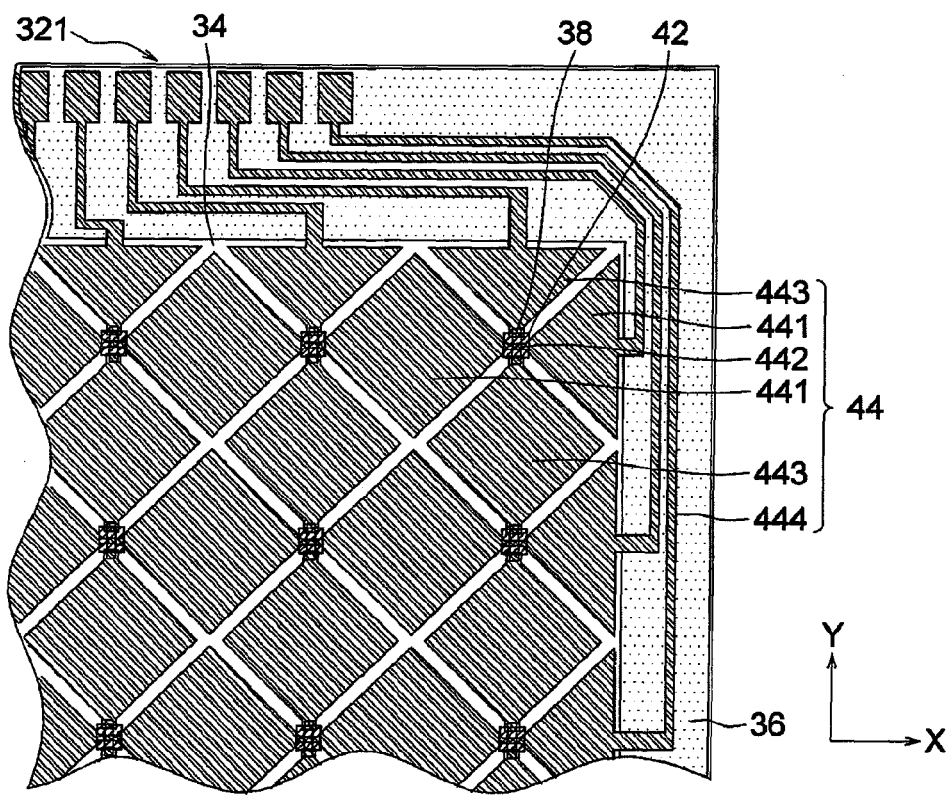
FIG. 2D illustrates a top view of a thin touch panel formed with a black bordering, metal connecting structures, metal guiding lines, transparent insulators and a transparent sensing layer according to an embodiment of the present invention.

Further, referring to FIG. 2D, a transparent sensing layer 44 is disposed on the inner surface 321. The transparent sensing layer 44 comprises a plurality of first sensing pads 441, a plurality of transparent conductive connecting structures 442, a plurality of second sensing pads 443 and a plurality of transparent guiding lines 444. The first sensing pads 441 and the second sensing pads 443 are arranged alternately, and the second sensing pads 443 are disposed adjacent to and isolated from one another on the inner surface 321 of the sensing region 34. The transparent conductive connecting structures 442 are respectively disposed across and covering surfaces of each transparent insulator 42 to electrically connect the first sensing pads 441 along a first direction X, and every two adjacent and isolated second sensing pads 443 are electrically connected by the exposed opposite ends of each metal connecting structures 38 respectively along a second direction Y (the second direction Y is different to the first direction X). In addition, a plurality of transparent guiding lines 444 cover corresponding surfaces of the metal guiding lines 40 (as illustrated in FIG. 2B). One end of each transparent guiding line 444 is electrically connected with a first sensing pad 441 or a second sensing pad 443 adjacent to the edges of the sensing region 34, and the other end of each transparent guiding line 444 is electrically connected with a signal output flat cable or a conductive circuit (not shown).

In an embodiment, the first sensing pads 441 and the second sensing pads 443 are formed as rhombus shapes or polygon shapes, and sizes thereof are all the same or similar to one another. In addition, the transparent conductive connecting structures 442 are formed as strip shapes, thereby electrically connecting and tightly arranging the first sensing pads 441. The transparent sensing layer 44 is formed from a transparent photosensitive conductive material, such as indium tin oxide (ITO), indium zinc oxide (IZO), antimony tin oxide (ATO), aluminum zinc oxide (AZO), zinc oxide (ZnO), tin oxide (SnO2) or organic transparent conductive material. In addition, the first sensing pads 441, the transparent conductive connecting structures 442, the second sensing pads 443 and the transparent guiding lines 444 are formed by processing a photolithography process on the same transparent photosensitive conductive material.

Figure 2E:
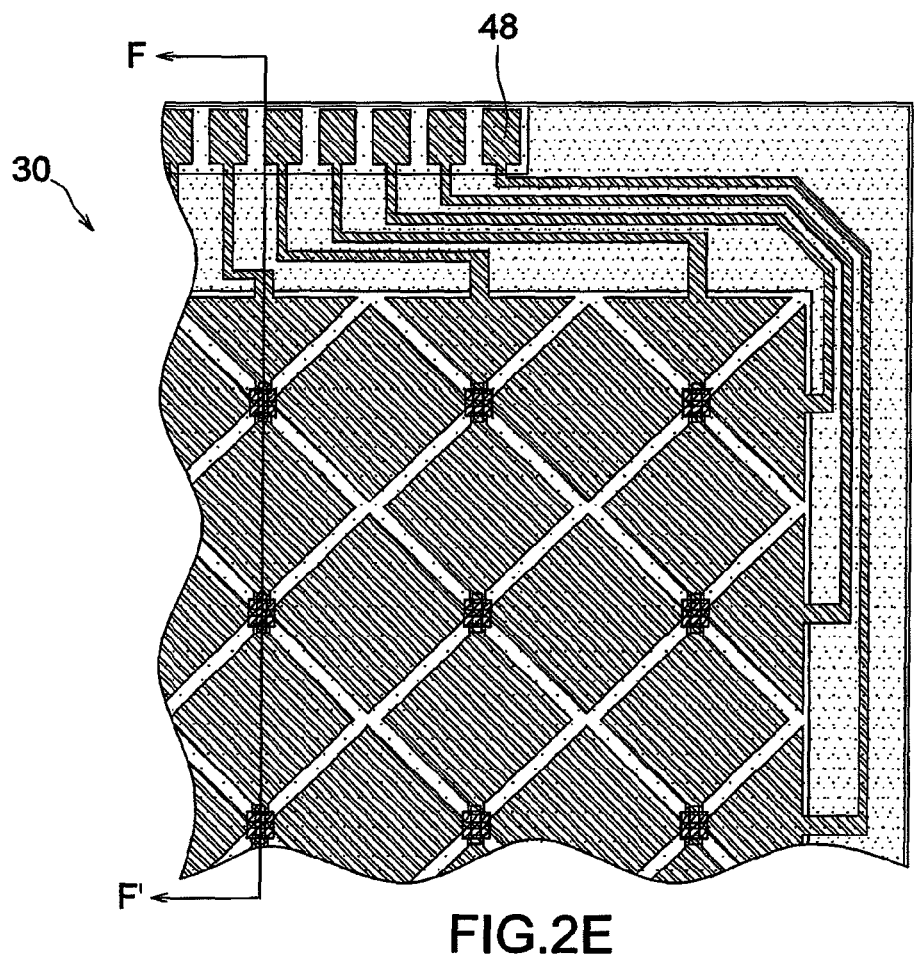
FIG. 2E illustrates a top view of a thin touch panel formed with a black bordering, metal connecting structures, metal guiding lines, transparent insulators, a transparent sensing layer and a transparent over coat according to an embodiment of the present invention.
Figure 2F:
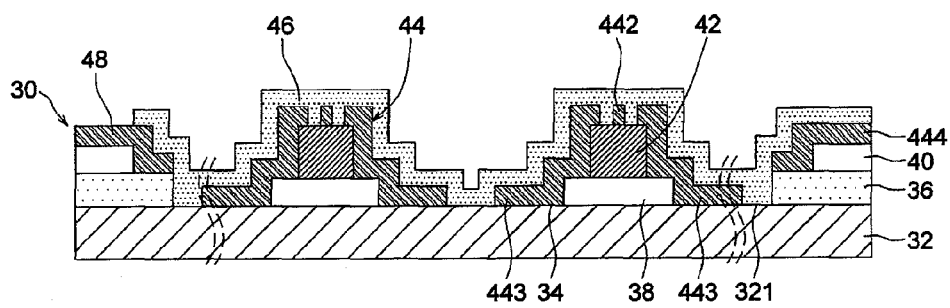
FIG. 2F illustrates a cross-sectional view of the FIG. 2E along the line F-F'.

Then referring to FIGS. 2E and 2F, wherein the FIG. 2F illustrates a cross-sectional view of the FIG. 2E along the line F-F'. A thin touch panel 30 may further comprise a transparent over coat 46 covering the transparent sensing layer 44, the transparent insulators 42, the metal connecting structures 38 and the metal guiding lines 40 mentioned above and only conductive pads 48 for electrically connecting outside are exposed, so as to protect the above-mentioned structure from being scraped except conductive pads 48. In an embodiment, the transparent over coat 46 is formed from an insulating material, such as, but not limited to, silicon oxide (SiO2).

Figure 2G:
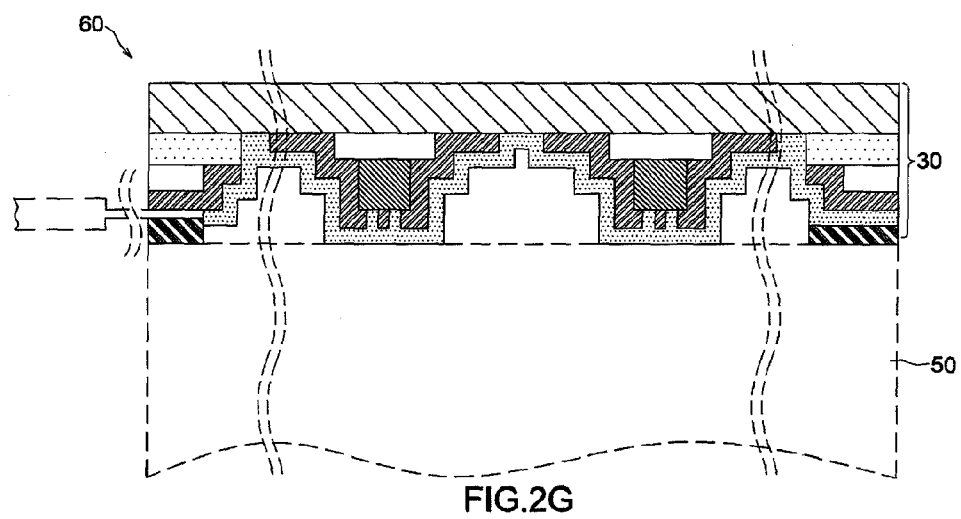
FIG. 2G illustrates an applied example of a thin touch panel.

Still referring to FIG. 2F, wherein a black bordering 36, metal connecting structures 38, metal guiding lines 40, transparent insulators 42 and a transparent sensing layer 44 are formed on the inner surface 321 of the transparent substrate 32. The metal guiding lines 40 and transparent guiding lines 444 of the transparent sensing layer 44 are formed on the black bordering 36, thereby being covered by the black bordering 36 and not exposed outside the transparent substrate 32, so as to have artistic, orderly and integral effects. As an applied example illustrated in FIG. 2G, a thin touch panel 30 of the present invention may be disposed on a display panel 50 to form a thin touch display screen 60.

Figure 3A:
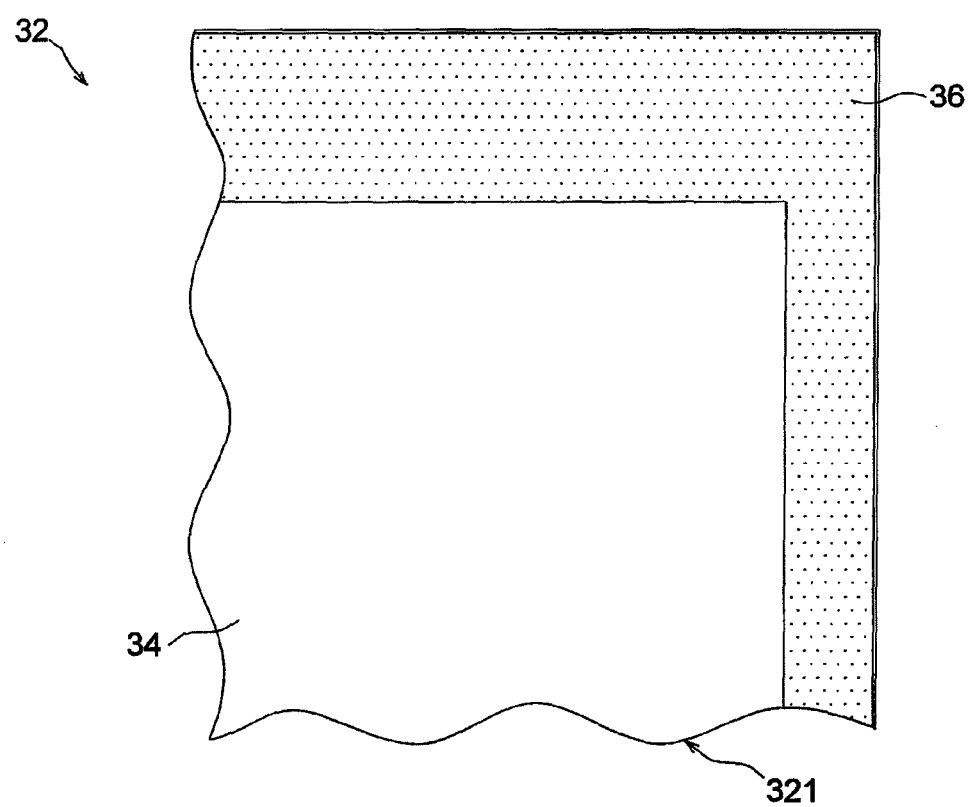
FIG. 3A illustrates a top view of a thin touch panel formed with a black bordering according to another embodiment of the present invention.

The present invention may further be formed by using another process. Referring to FIG. 3A, a thin touch panel comprises a transparent substrate 32 having an outer surface (not shown) and an inner surface 321 opposite to one another. The outer surface is capable of being a touch end. The inner surface 321 is designed with a sensing region 34, and a black bordering 36 are formed on edges of the inner surface 321 to dispose around the sensing region 34. In an embodiment, the transparent substrate 32 may be a transparent insulating board or a transparent insulating flexible board, and the black bordering 36 may be a black array pattern. The materials have been illustrated in the previous embodiment and are omitted herein.

Figure 3B:
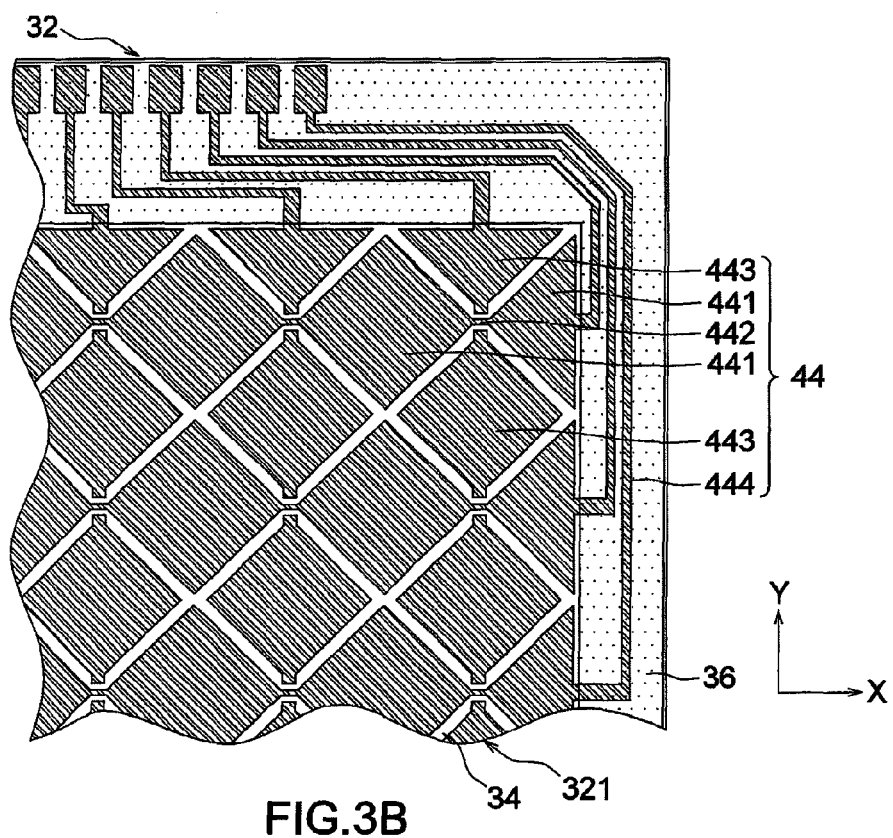
FIG. 3B illustrates a top view of a thin touch panel formed with a black bordering and a transparent sensing layer according to another embodiment of the present invention.

Further, referring to FIG. 3B, a transparent sensing layer 44 is disposed on an inner surface 321 of the transparent substrate 32. The transparent sensing layer 44 comprises a plurality of first sensing pads 441, a plurality of transparent conductive connecting structures 442, a plurality of second sensing pads 443 and a plurality of transparent guiding lines 444. The transparent conductive connecting structures 442 herein electrically connect the first sensing pads 441 along a first direction X, and the second sensing pads 443 are adjacent to and isolated from one another and alternately arranged with the first sensing pads 441. In addition, the transparent guiding lines 444 are formed on the black bordering 36 over the inner surface 321, and part of the transparent guiding lines 444 are electrically connected to the first sensing pads 441 adjacent to the edges of the sensing region 34, and another part of the transparent guiding lines 444 are electrically connected to the second sensing pads 443 adjacent to the edges of the sensing region 34. The other end of each transparent guiding line 444 is electrically connected with a signal output flat cable or a conductive circuit (not shown). Similarly, the shapes, the materials and the processes of the first sensing pads 441, the second sensing pads 443, the transparent conductive connecting structures 442 and the transparent guiding lines 444 have been illustrated in the previous embodiment and are omitted herein.

Figure 3C:
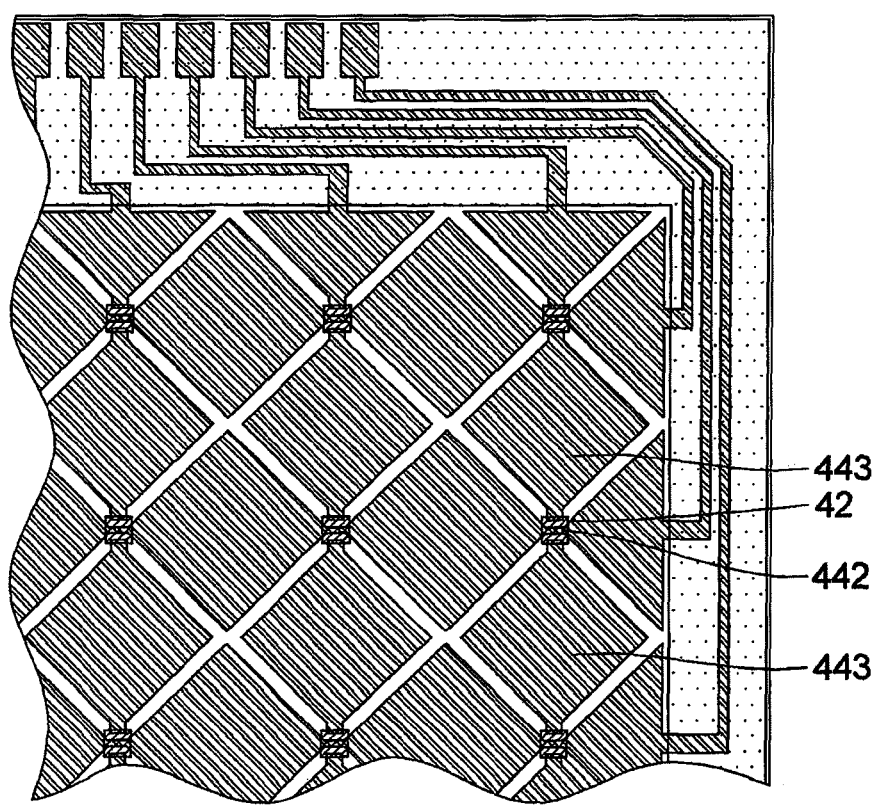
FIG. 3C illustrates a top view of a thin touch panel formed with a black bordering, a transparent sensing layer and transparent insulators according to another embodiment of the present invention.

Then referring to FIG. 3C, a plurality of transparent insulators 42 are respectively corresponding to and covers on each transparent conductive connecting structures 442, and respectively crossing on two adjacent ends of two isolated second sensing pads 443. The material and the process of the transparent insulators 42 have been illustrated in the previous embodiment and are omitted herein.

Figure 3D:
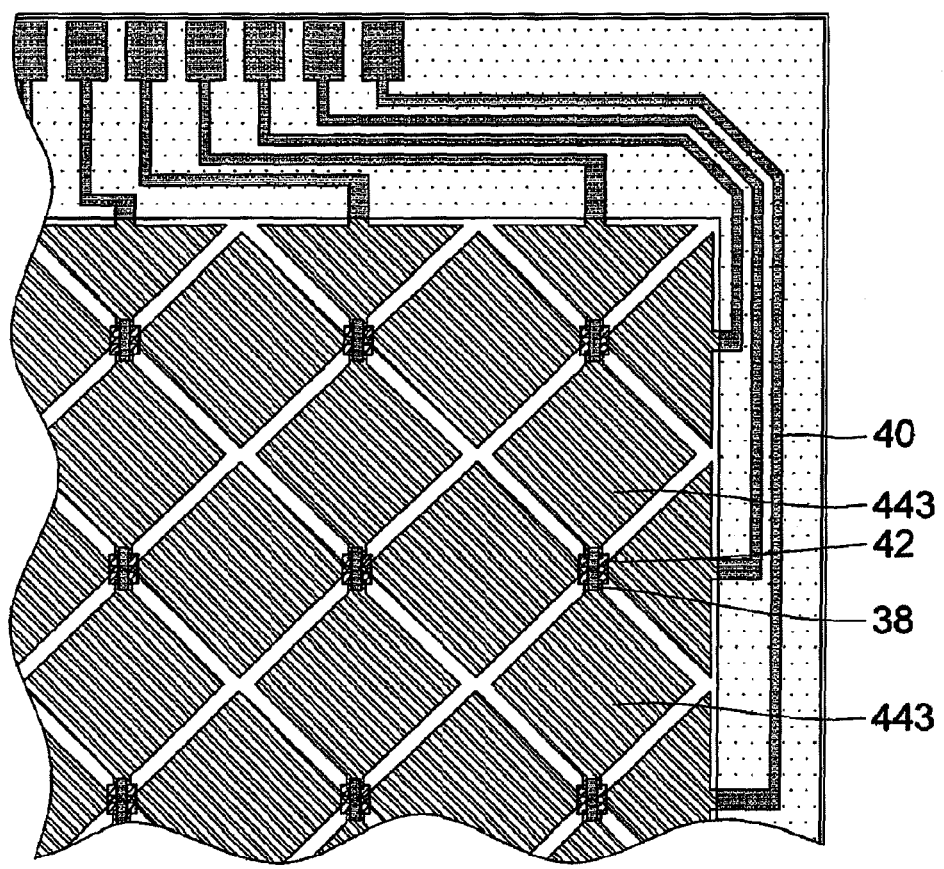
FIG. 3D illustrates a top view of a thin touch panel formed with a black bordering, a transparent sensing layer, transparent insulators, metal connecting structures and metal guiding lines according to another embodiment of the present invention.

In addition, referring to FIG. 3D, a plurality of metal connecting structures 38 are arranged as an array and respectively formed on a surface of each transparent insulators 42 to electrically connect every two adjacent and isolated second sensing pads 443 along a second direction Y (the second direction is different to the first direction), and a plurality of metal guiding lines 40 are formed on the transparent guiding lines 444. The metal materials and the processes thereof have been illustrated in the previous embodiment and are omitted herein.

Figure 3E:
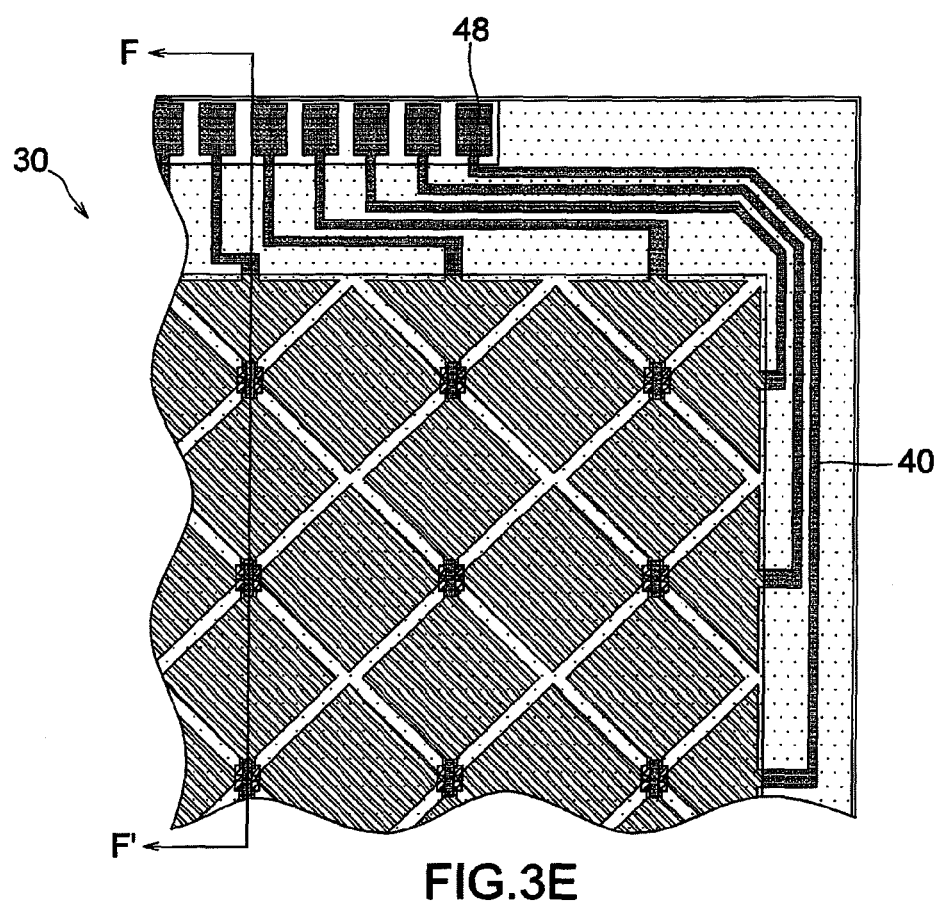
FIG. 3E illustrates a top view of a thin touch panel formed with a black bordering, a transparent sensing layer, transparent insulators, metal connecting structures, metal guiding lines and a transparent over coat according to another embodiment of the present invention.
Figure 3F:
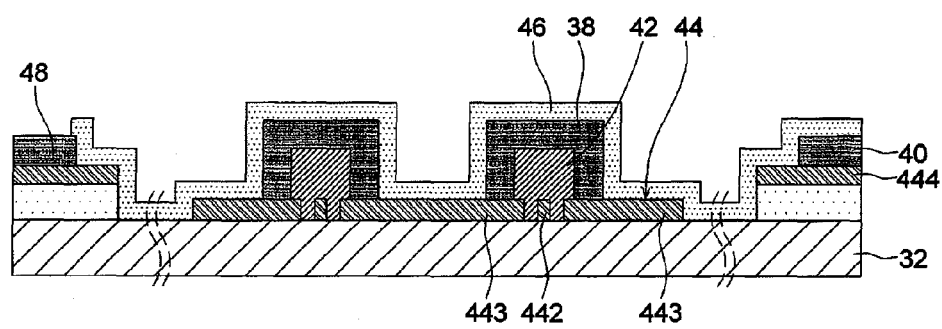
FIG. 3F illustrates a cross-sectional view of the FIG. 3E along the line F-F'.
Figure 3G:
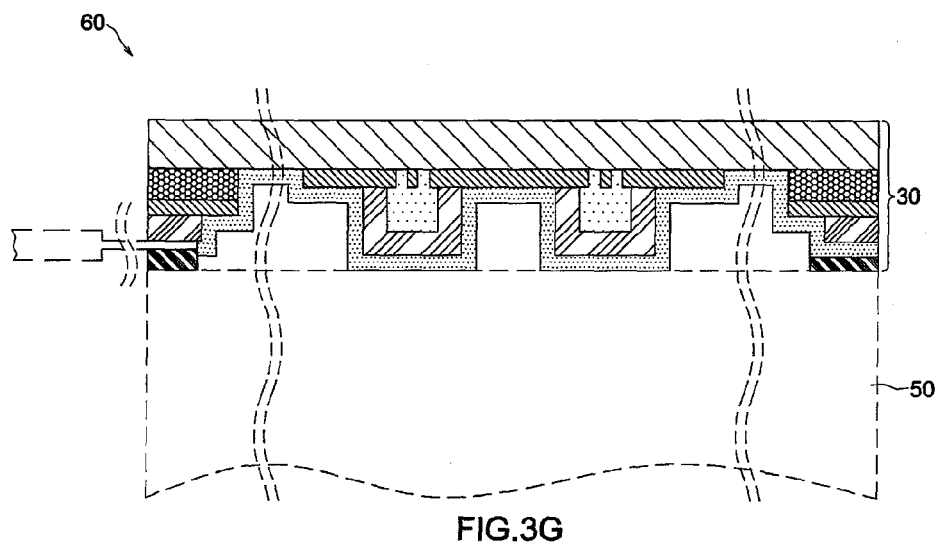
FIG. 3G illustrates an applied example of a thin touch panel.

Then referring to FIGS. 3E and 3F, wherein the FIG. 3F illustrates a cross-sectional view of the FIG. 3E along the line F-F'. A thin touch panel 30 may further comprise a transparent over coat 46 covering the transparent sensing layer 44, the transparent insulators 42, the metal connecting structures 38 and the metal guiding lines 40 mentioned above and only conductive pads 48 for electrically connecting outside are exposed, so as to protect the above-mentioned structure from being scraped except conductive pads 48. FIG. 3G illustrates an applied example of the present invention. Referring to FIG. 3G, a thin touch panel 30 may be disposed on a display panel 50 to form a thin touch display screen 60.

In summary, the black bordering, the sensing layer, the metal connecting structures, the transparent insulators and the guiding lines of the present invention are directly formed on the inner surface of the transparent substrate, thereby comprising the following benefits;

1. the transparent substrate not only capable of being a touch end, but also having a touch control ability of thin touch panel directly;

2. comparing to the conventional touch panel, the glass substrate of the touch panel disposed between the cover lens and the display panel in the present invention capable of being simplified, so as to reduce material consumption and increase a transparency of the touch panel;

3. in the steps of manufacturing the structure of the present invention, the process of sticking the cover lens and the glass substrate by using the optical adhesive capable of being left out, so as to further reduce the cost of the sticking process and enhance the yield rate; and 4. the thickness of the whole structure of the touch panel capable of being reduced, so as to benefit a design tendency of thinning out the product.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A thin touch panel, comprising:
a transparent substrate, having an outer surface and an inner surface opposite to one another, said outer surface capable of being a touch end;
a black bordering, formed on edges of said inner surface to dispose around a sensing region;
a plurality of conductive material connecting structures, arranged as an array and formed on said sensing region, and a plurality of conductive material guiding lines formed on a surface of said black bordering;
a plurality of transparent insulators, respectively corresponding to each of said conductive material connecting structures, and respectively covering part of said conductive material connecting structures, two opposite ends of said conductive material connecting structures being exposed;
a transparent sensing layer, comprising:
a plurality of first sensing pads, arranged on said sensing region as an array;
a plurality of transparent conductive connecting structures, disposed across surfaces of said transparent insulators to electrically connect said first sensing pads along a first direction;
a plurality of second sensing pads, arranged on said sensing region as an array, and said second sensing pads being electrically connected along a second direction by exposed said opposite ends of said conductive material connecting structures, said second direction different to said first direction; and
a plurality of guiding lines, formed on said black bordering or said conductive material guiding lines, and electrically connected to part of said first sensing pads and part of said second sensing pads; and
a transparent over coat, covering said sensing layer, said transparent insulators, said conductive material connecting structures and said conductive material guiding lines.

2. The thin touch panel as claimed in claim 1, wherein said transparent substrate is a transparent insulating board or a transparent insulating flexible board with a material of glass, polycarbonate (PC), polythylene terephthalate (PET), polymethylmethacrylate (PMMA), cyclic olefin copolymer (COC) or polyether sulfone (PES).

3. The thin touch panel as claimed in claim 1, wherein said black bordering is a black array pattern made of chromium (Cr), chromium oxide or resin.

4. The thin touch panel as claimed in claim 1, wherein said conductive material connecting structures and said conductive material guiding lines are made of a material comprising silver (Ag), chromium (Cr), aluminum (Al) or a molybdenum/aluminum/molybdenum (Mo/Al/Mo) stack layer.

5. The thin touch panel as claimed in claim 1, wherein a material of said transparent insulators is PET.

6. The thin touch panel as claimed in claim 1, wherein said transparent sensing layer comprising a material of indium tin oxide (ITO), indium zinc oxide (IZO), antimony tin oxide (ATO), aluminum zinc oxide (AZO), zinc oxide (ZnO), tin oxide (SnO2), or organic transparent conductive material.

7. The thin touch panel as claimed in claim 1, wherein a material of said transparent over coat is silicon oxide (SiO2) or PET.

8. A thin touch panel, comprising:
a transparent substrate, having an outer surface and an inner surface opposite to one another, said outer surface capable of being a touch end;
a black bordering, formed on edges of said inner surface to dispose around a sensing region;
a transparent sensing layer, comprising:
a plurality of first sensing pads and a plurality of transparent conductive connecting structures, formed on said sensing region of said inner surface, and said transparent conductive connecting structures electrically connecting said first sensing pads along a first direction;
a plurality of second sensing pads, formed on said sensing region, and isolated from one another and alternately arranged with said first sensing pads; and
a plurality of guiding lines, formed on a surface of said black bordering, and electrically connected to part of said first sensing pads and part of said second sensing pads;
a plurality of transparent insulators, respectively covering each of corresponding said transparent conductive connecting structures, and each of said transparent insulators crossing on two adjacent ends of two isolated said second sensing pads;
a plurality of conductive material connecting structures, respectively formed on each of said transparent insulators, and electrically connecting said second sensing pads along a second direction, said second direction different to said first direction;
a plurality of conductive material guiding lines, formed on said black bordering or said guiding lines; and
a transparent over coat, covering said sensing layer, said transparent insulators, said conductive material connecting structures and said conductive material guiding lines.

9. The thin touch panel as claimed in claim 8, wherein said transparent substrate is a transparent insulating board or a transparent insulating flexible board with a material of glass, PC, PET, PMMA, COC or PES.

10. The thin touch panel as claimed in claim 8, wherein said black bordering is a black array pattern made of Cr, chromium oxide or resin.

11. The thin touch panel as claimed in claim 8, wherein said transparent sensing layer comprising a material of ITO, IZO, ATO, AZO, ZnO, SnO2, or organic transparent conductive material.

12. The thin touch panel as claimed in claim 8, wherein a material of said transparent insulators is PET.

13. The thin touch panel as claimed in claim 8, wherein said conductive material connecting structures and said conductive material guiding lines are made of a material comprising Ag, Cr, Al or a Mo/Al/Mo stack layer.

14. The thin touch panel as claimed in claim 8, wherein a material of said transparent over coat is SiO2 or PET.

* * * * *